July 7, 1964   R. B. GROVER   3,139,676
DIE RAISING AND CHANGING DEVICE
Filed Nov. 22, 1961   2 Sheets-Sheet 1
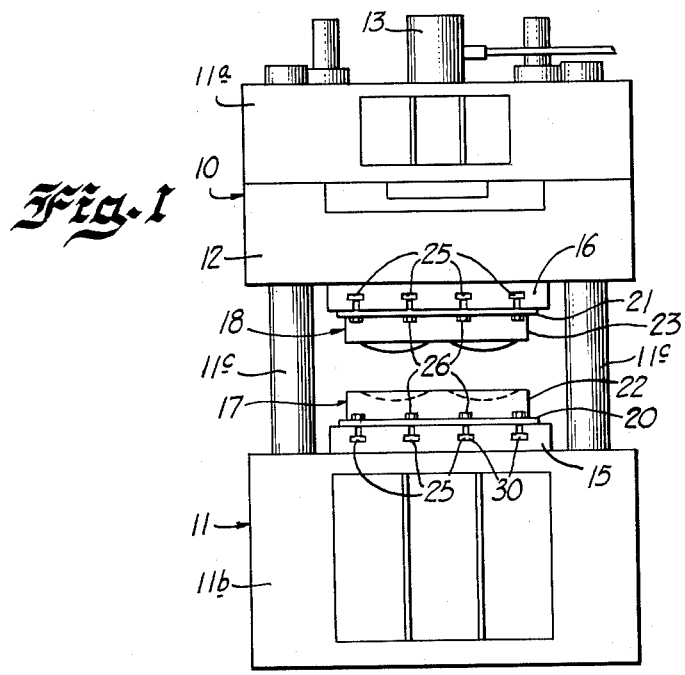
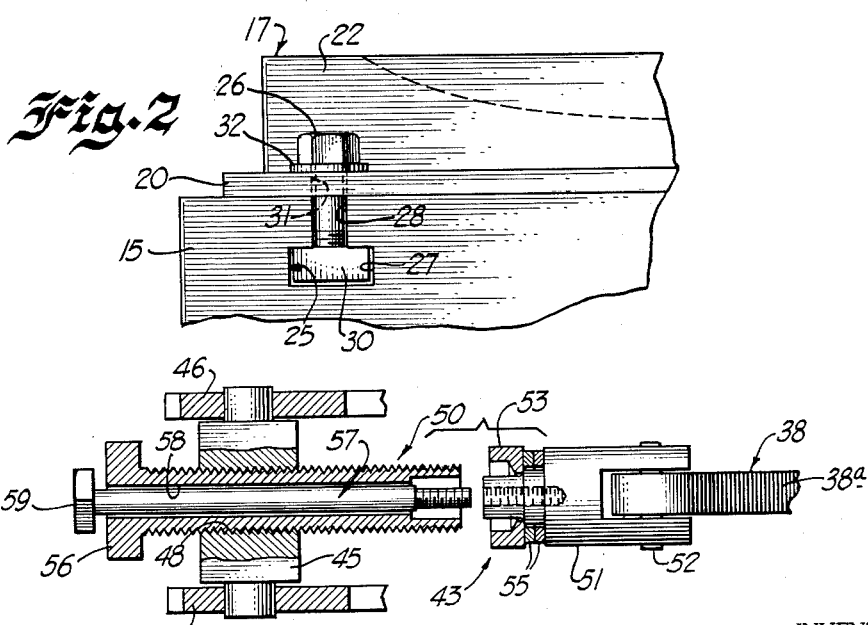
INVENTOR.
RAYMOND B. GROVER
BY
Mason, Kolehmainen, Rathburn and Wyss
ATTORNEYS.

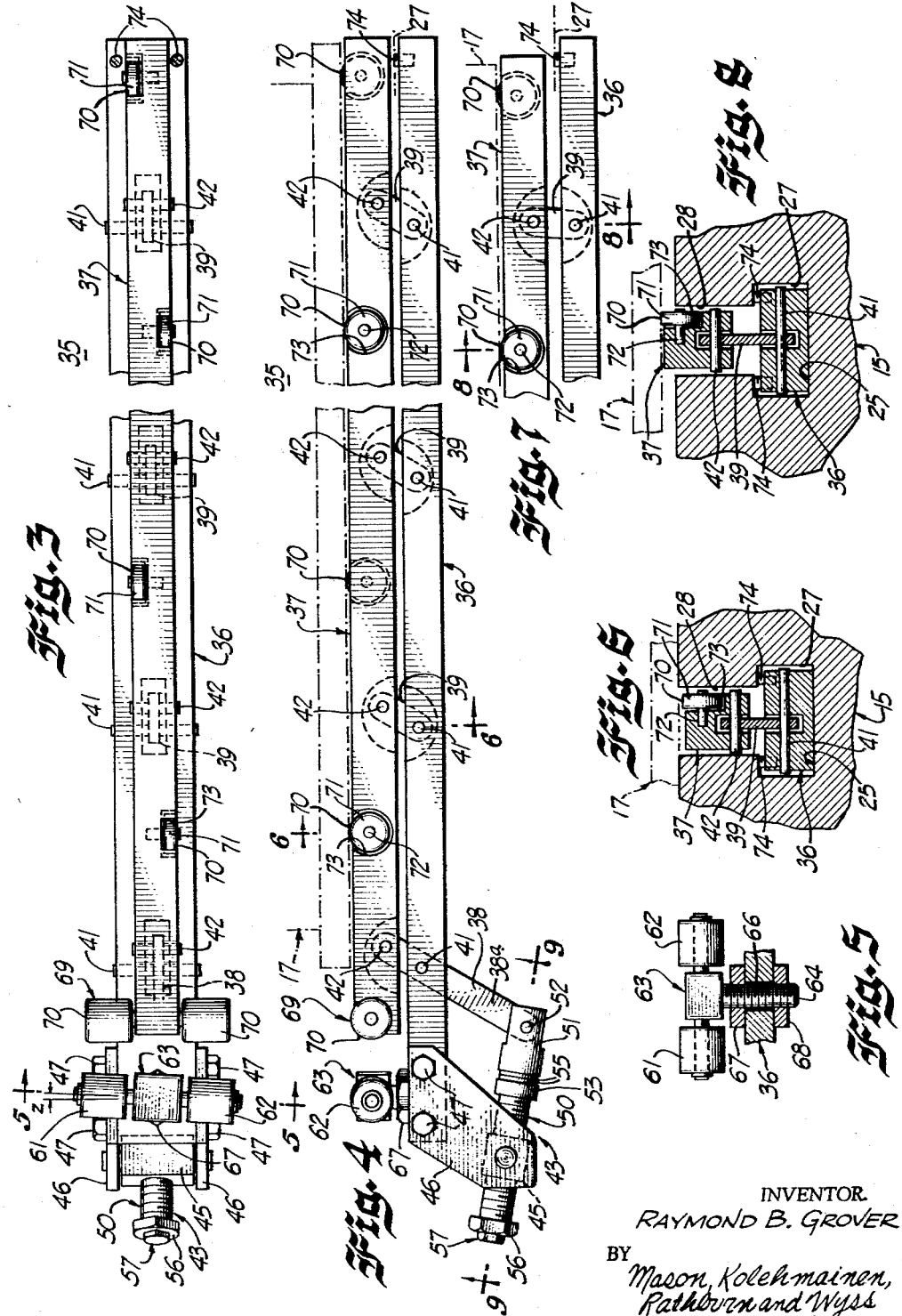

3,139,676
DIE RAISING AND CHANGING DEVICE
Raymond B. Grover, 108 N. 1st St., Fairbury, Ill.
Filed Nov. 22, 1961, Ser. No. 154,287
5 Claims. (Cl. 29—256)

The present invention relates to an easy-change die device and, more particularly, to a device for facilitating the installation and removal of a die on a machine tool.

Heretofore, difficulties have been encountered in installing and removing heavy dies onto the bolster plate of a machine tool such as a press. Such dies are bolted down to the bolster plate by cooperation with the T-slots commonly provided on the bolster plate. The problem of installation and removal of the dies onto the bolster plate of the machine tool is not only encountered during initial set-up and tear-down of the machine, such as during model changes in an automobile plant, but, additionally, the dies must be removed occasionally, for example, after forty thousand forming operations, to be cleaned and trued up, and of course the dies may have to be removed occasionally for repair.

For small size dies, lift trucks have been employed. However, difficulty is experienced in positioning the fingers of the lift truck under the die as it rests on the bolster plate of the tool. In larger sizes the dies have been pulled off the machine tool by the winch of a truck and have been pushed on by a cam. However, such means have not been entirely satisfactory, being not only inconvenient and awkward but resulting in excessive scarring of the die and the bolster plate surfaces.

Accordingly, it is an object of the present invention to provide a new and improved device for installing and removing dies from machine tools.

Another object of the present invention is to provide a new and improved device for raising and lowering dies relative to the bolster plate of a machine tool.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is an elevational view illustrating a typical machine tool wherein the easy-change die device according to the present invention may be utilized;

FIG. 2 is an enlarged fragmentary view of a section of the machine tool of FIG. 1 illustrating the connection of the die to the bolster plate thereof through a bolt and T-slot connection;

FIG. 3 is a fragmentary plan view of an easy-change die device according to the present invention;

FIG. 4 is a side elevational view of the easy-change die device of FIG. 3 shown in one of its operating positions;

FIG. 5 is a partial sectional view of the easy-change die device of FIG. 3, taken along line 5—5 of FIG. 3;

FIG. 6 is a sectional view of the easy-change die device of FIG. 3, taken along line 6—6 of FIG. 4, assuming it is disposed in a T-slot;

FIG. 7 is a fragmentary elevational view of the easy-change die device illustrated in FIG. 3, but shown in another of its operating positions;

FIG. 8 is a sectional view of the easy-change die device of FIG. 3 illustrated in the position of FIG. 7, taken along line 8—8 of FIG. 7, assuming it is disposed in a T-slot; and FIG. 9 is an enlarged cross-sectional exploded view of the driving mechanism for the easy-change die device illustrated in FIG. 3, taken along line 9—9 of FIG. 4.

In accordance with these and other objects of the present invention, there is provided an easy-change die device comprising individual jack means insertable one in each of two or more spaced T-slots commonly provided in the bolster plate of a machine tool. These jack means are effective to raise or lower the die relative to the bolster plate. Moreover, the easy-change die device is provided with rollers permitting the rolling of the die from the bolster plate once it has been raised from the surface thereof.

In a specific embodiment the die raising and lowering device for moving a die relative to a bolster plate of a machine of the type provided with T-slots includes a pair of operatively associated elongated members which together form a generally T-shaped section and which are adapted to be positioned in the T-slot of the machine. The members are interconnected by a plurality of parallel links pivotally connected to each of the members. Means are provided for pivoting one of the links to effect movement of the members relative to each other.

Referring now to FIGS. 1 and 2, there is illustrated a typical machine tool 10, here shown as a hydraulic press, for which the easy-change die device according to the present invention may be used. The hydraulic press 10 includes a stationary frame 11 including an upper and lower frame portion 11a and 11b, respectively, interconnected by a plurality of guide columns 11c. The press 10 is provided with a ram 12 movable relative to the stationary frame under the control of a hydraulic cylinder 13 along the guide columns 11c. As is well known, the lower frame portion 11b and the ram 12 are each provided with confronting bolster plates 15 and 16, each adapted to carry a die section 17 and 18, respectively. Each of the die sections 17 and 18 may contain a die shoe 20 and 21, and a die portion 22 and 23, respectively. Each of the bolster plates 15 and 16 is customarily provided with a plurality of parallel spaced recesses 25 of T-shaped cross section, hereinafter referred to as T-slots, and spaced on six, seven or eight-inch centers. The die sections 17 and 18 may be quite large and heavy, weighing up to several tons, and are secured to the respective bolster plates 15 and 16 through a plurality of bolts 26 associated with the respective T-slots 25.

A typical T-slot and bolted connection is illustrated in FIG. 2. As therein illustrated, the T-shot 25 in the bolster plate 15 of the hydraulic press includes a generally rectangular head section 27 forming the crossbar of an inverted T, and additionally includes a generally rectangular throat section 28 communicating between the head section 27 and the upper surface of the bolster plate 15 to form an inverted T-shape recess in the bolster plate 15. As illustrated, a plurality of nuts 30 are positioned in the T-slots 25 for the reception of the bolts 26. Conventionally, the nuts 30 are square nuts and dimensioned to loosely fit within the head section 27 of the T-slot, but of course being wider than the narrower throat section 28 thereof. The bolts 26 pass through openings 31 in the die shoe 20 and are threadedly received within the nuts 30 thereby securing the die section 17 to the bolster plates 16. If desired, a washer 32 may be positioned under the head of the bolt 26.

In accordance with the present invention, there is provided an easy-change die device, generally illustrated at 35 (FIGS. 3 to 9) and positionable within the T-slot 25 to raise and lower the die section 17. The easy-change die device 35 includes a rectangular base bar 36 loosely conforming in cross section to the cross section of the head section 27 of the T-slot 25, and additionally includes a rectangular upright bar 37 loosely conforming in cross section to the cross section of the throat section 28. The bars 36 and 37, when positioned within the T-slot 25, act like a jack and expand relative to each other within the T-slot to raise and lower the die section 17.

For moving the bars 36 and 37 relative to each other in somewhat scissor-jack fashion, there is provided a plurality of parallel connecting links, a front one of which is identified as 38 and the remainder of which are identical to each other and identified as 39. Links 38 and 39 are all provided with spaced points pivotally connected to the respective bars 36 and 37, thereby maintaining the upright bar 37 at all times parallel to the base bar 36 and providing for oscillatory movement of the upright bar 37 relative to the base bar 36 toward and away from the base bar 36. Pivot pins 41 and 42 interconnect the spaced points on the connecting links 38 and 39 with the base bar 36 and upright bar 37.

In order to provide means for moving the bars 36 and 37 relative to each other, there is provided an actuating means generally indicated at 43, best illustrated in FIGS. 4 and 9. As therein illustrated, the actuating means 43 includes a pivot link or crosshead 45 pivotally supported between a pair of downwardly extending spaced plates 46 fastened to the base plate 36 by a plurality of bolts 47. The crosshead 45 is provided with a central threaded aperture 48 threadedly receiving a hollow tubular bolt or adjusting member 50. The adjusting member 50 bears against a bifurcated or U-shaped link member 51 pivotally connected to an extension 38a of the front connecting link 38 by a pivot pin 52. Threading of the adjusting member 50 into the crosshead 45 is effective to pivot the connecting link 38 counterclockwise as viewed in FIG. 4 to cause the upright bar 37 to move away or raise relative to the base bar 36. Of course, it will be understood that rotation of the connecting link 38 will cause similar rotation of the remaining links 39. The links 38 and 39 consequently will always remain in parallel relation, as will the bars 37 and 36. It has been found that in a lowered position it is preferable if the front connecting link 38 makes no more than a 30° angle relative to the adjusting member 50 in order that suitable mechanical advantage may be gained by the adjusting member 50 to effect the movement of the bars 36 and 37 relative to each other.

To provide a bearing surface for the rotation of the adjusting member 50, the adjusting member 50 bears against the bifurcated link member 51 through a cup-shaped bearing member 53 and a plurality of thrust washers 55, as best illustrated in FIG. 9. Moreover, to facilitate turning of the adjusting member 50 it is provided with a standard hexagonal head 56 which will accommodate standard hand wrenches.

To prevent disassembly of the bifurcated link member 51 and the adjusting member 50 and to provide a positive return or lowering of the bar 37, there is provided a conventional bolt 57, best shown in FIG. 9, extending through a tubular axial opening 58 in the adjusting member 50 and threadedly secured in the bifurcated link member 51. The bolt member 57 is of course provided with a standard hexagonal head 59 which serves not only to provide a means of originally tightening the bolt 57 into the bifurcated link member 51, but additionally serves to engage the head 56 of the adjusting member 50 when the adjusting member 50 is being turned out of the threaded aperture 48 in the crosshead 45. In this manner the head 56 of the adjusting member 50 will be effective to push the bolt 57 to the left, as viewed in FIG. 9, to form a positive closure of the bars 36 and 37 relative to each other.

In one particular easy-change die device constructed according to the present invention, it was found that the bar 37 may be raised .235 of an inch above the base bar 36; moreover, it was found that a travel of approximately .100 of an inch is sufficient to provide for rolling of the die section 17 from the bolster plate 15.

As best illustrated in FIGS. 3, 4 and 5, there is provided adjacent the forward end of the easy-change device 35 a pair of front rollers 61 and 62 pivotally supported on the crossarms of a T-shaped fitting 63 and arranged at a slight angle Z to the transverse axis of the easy-change device 35. As illustrated, the angle Z is shown exaggerated, but in one embodiment was about 1°. The rollers 61 and 62 are effective to engage the lower surface of the die section 17 when it is displaced slightly from its position in the press 10, thereby to facilitate installation and removal thereof. It has been found that when a pair of easy-change die devices are used in changing a die, as would ordinarily be used, one of the easy-change die devices would have the front rollers 61 and 62 adjusted to slant in one direction and the front rollers 61 and 62 on the other of the easy-change devices would be adjusted to slant in the opposite direction. In this manner, the front rollers on the pairs of easy-change die devices are toed out. It has been found that the slant or toe-out on the pairs of rollers 61 and 62 facilitates in rolling the die section 17 true or straight. On the other hand, if the rollers 61 and 62 on the respective easy-change die devices were on aligned axes, any tendency of the die 17 rolling thereon to roll out of a straight course would be accentuated thereby.

Although the rollers 61 and 62 are fixedly secured to the base bar 36 by a threaded portion 64 of the fitting 63 extending through an aperture 66 (FIG. 5) in the bar 36 and held in place by a pair of nuts 67 and 68 threaded on the threaded portion 64 and clamping the bar 36, the height and angle of slant of the rollers 61 and 62 relative to the bar 36 may readily be adjusted by the respective positioning of the nuts 67 and 68. This permits the easy-change device readily to be adapted for use with bolster plates 15 having T-slots 25 with throat sections 28 of varying depth. Such variation in the depth 26 not only occurs between different bolster plates but may occur on the same bolster plate due to machining of the surface thereof to remove scratches, indents and other irregularities caused by normal wear of the bolster plates.

To provide for rolling of the die 15 over the upright bar 37, the upright bar 37 carries a pair of intermediate roller means 69 and a pluruality of staggered roller means 70, each roller means comprising a hardened roller 71 rotatably mounted on a shaft 72. The roller means 69 extend on opposite sides of the upright bar 37 while the roller means 70 are recessed into generally circular segmented recess 73 in the side surface of the upright bar 37; however, all the rollers 71 are positioned sufficiently high on the upright bar 37 so that the top of the rollers 71 extend above the upper surface of the upright bar 37 thereby to engage the lower surface of the die section 17. Staggering of the roller means 70 on opposite sides of the upright bar 37 prevents a roller from getting caught in one of the bolt openings 31 on the die 17. In one particular easy-change device, the respective roller means 70 were spaced approximately three and one-half inches longitudinally along the upright bar 37.

Since the base bar 36 is a loose fit within the head section 27 of the T-slot 25, a pair of Allen screws 74 extend upwardly from the rear of the base bar 36 spaced on opposite sides of the upright bar 37 to engage the upper surface of the head section 27, thereby preventing tilting of the easy-change device 35 when the weight of the die 17 is on the forward or overhanging portion of the easy-change device 35. The Allen screws 74 can be adjusted, as best illustrated in FIGS. 6 and 8, to prevent play between the base bar 36 and the head section 27 of the T-slot 25.

From the above detailed description, the operation of the improved easy-change device will readily be understood by those skilled in the art. However, briefly, when it is desired to remove the die section 17 from the bolster plate 15, the bolts 26 are removed and the easy-change device 35, with the adjusting member 50 thereof threaded out so that the upright bar 37 rests against, or is close to, to base bar 36, is then slipped into the T-slot 25, pushing the nuts 30 therein out of the way. It will be appreciated that at least a pair of the easy-change devices 35 will be used in respective spaced ones of the T-slots 25, with the front rollers 61 and 62 of the easy-change devices being slanted in opposite directions to form a toed out trackway for the die 17.

The Allen screws 74 will be adjusted in the base member 36 to provide a relatively tight fit between the base bar 36 and the head section 27 of the T-slot 25. Moreover, the rollers 61 and 62 will be vertically adjusted to the proper height to receive a die section 17 when it is rolled out from the press 10. With the easy-change devices 35 thus positioned within the T-slots 25, the adjusting members 50 will be threaded into the apertures 48 in the crossheads 45, thereby pivoting the front connecting link 38 counterclockwise as viewed in FIG. 4 to pivot the remaining connecting links 39 and move the upright bar 37 vertically relative to the base bar 36 from the position illustrated in FIGS. 4 and 6 to the position illustrated in FIGS. 7 and 8. This upward movement of the upright bar 37 will cause the rollers 70 of the easy-change devices 35 to engage the base of the die section 17 and lift the die section from the upper surface of the bolster plates 15, as best illustrated in FIG. 8. The die section 17 can now be rolled from the press 10 without danger of damage to the die section 17 or the bolster plate 15.

It will be appreciated that the die section 17 may be installed in the press pan in reverse manner to that described above.

Although the present invention has been described in connection with a single embodiment thereof, it is obvious that numerous other embodiments may be devised by those skilled in the art. It is, therefore, intended in the appended claims to cover all such embodiments as fall within the true spirit and scope of the principles of this invention.

What is claimed as new and is desired to be secured by Letters Patent of the United States is:

1. A machine tool assembly comprising a machine tool of the type provided with a bolster plate having T-slots in its surface, said T-slots each having a head and a throat portion; a die on said bolster plate adapted to be fastened with said T-slots; and a die changing device for raising and lowering said die relative to said bolster plate, said device including a first elongated member inserted within said head portion of said T-slot, a second elongated member inserted within said throat portion of said T-slot, means moving said members relative to each other, and roller means operatively associated with said second elongated member for engaging the bottom of said die to raise and lower said die relative to said tool.

2. A machine tool assembly comprising a machine tool of the type provided with a bolster plate having T-slots in its surface, said T-slots including head portions and throat portions; a die on said bolster plate adapted to be fastened with said T-slots; and a die changing device inserted in said T-slot for raising and lowering said die relative to said bolster plate of said machine tool, said device including a first bar of rectangular cross section loosely conforming to the head of a T-slot, said second bar of rectangular cross section loosely conforming to the throat of said T-slot, a plurality of parallel links pivotally connected to each of said bars to operatively interconnect said bars for movement relative to each other, and means supported by one of said bars for pivotally driving one of said links to effect said movement of said bars.

3. A die changing device for raising and lowering a die relative to a bolster plate of a machine tool such as a press which is provided with T-slots for securing the die to the machine, said T-slots including head portions and throat portions, said device comprising a first bar of rectangular cross-section loosely conforming to the head of a T-slot, a second bar of rectangular cross-section loosely conforming to the throat of a T-slot, a plurality of parallel links pivotally connected to each of said bars to operatively interconnect said bars for movement relative to each other, means supported by one of said bars for pivotally driving one of said links to effect said movement of said bars, and roller means operatively supported by said second bar engageable with the lower surface of a die and including a plurality of rollers staggeredly placed on opposite sides of said second bar.

4. A die changing device for raising and lowering a die relative to a bolster plate of a machine tool such as a press which is provided with T-slots for securing the die to the machine, said T-slots including head portions and throat portions, said device comprising a first bar of rectangular cross-section loosely conforming to the head of a T-slot, a second bar of rectangular cross-section loosely conforming to the throat of a T-slot, a plurality of parallel links pivotally connected to each of said bars to operatively interconnect said bars for movement relative to each other, means supported by one of said bars for pivotally driving one of said links to effect said movement of said bars, and means including set screw means adjustably threaded into the upper surface of said first bar and engageable with the upper surface of the head portion of a T-slot for rigidly securing said first bar within the head portion of a T-slot.

5. A die changing device for raising and lowering a die relative to a bolster plate of a machine tool such as a press which is provided with T-slots for securing the die to the machine, said T-slots including head portions and throat portions, said device comprising a first bar of rectangular cross-section loosely conforming to the head of a T-slot, a second bar of rectangular cross-section loosely conforming to the throat of a T-slot, a plurality of parallel links pivotally connected to each of said bars to operatively interconnect said bars for movement relative to each other, means supported by one of said bars for pivotally driving one of said links to effect said movement of said bars, and fixed roller means adjustably supported from said first bar in front of said second bar for engagement with the lower surface of a die.

References Cited in the file of this patent

UNITED STATES PATENTS

| 1,276,210 | Hamelback | Aug. 20, 1918 |
| 2,469,048 | Manke | May 3, 1949 |
| 2,693,286 | Cocks | Nov. 2, 1954 |
| 3,011,665 | Wise | Dec. 5, 1961 |
| 3,029,960 | Evans | Apr. 17, 1962 |